US007013645B2

(12) United States Patent
Brewington (10) Patent No.: US 7,013,645 B2
(45) Date of Patent: Mar. 21, 2006

(54) APPARATUS AND METHOD FOR GENERATING ELECTRICAL ENERGY

(75) Inventor: Doyle W. Brewington, Spring, TX (US)

(73) Assignee: Power Tube, Inc., Houston, TX (US)

( * ) Notice: Subject to any disclaimer, the term of this patent is extended or adjusted under 35 U.S.C. 154(b) by 0 days.

(21) Appl. No.: 10/330,052

(22) Filed: Dec. 30, 2002

(65) Prior Publication Data

US 2003/0230086 A1 Dec. 18, 2003

Related U.S. Application Data (60) Provisional application No. 60/389,283, filed on Jun. 18, 2002, provisional application No. 60/389,282, filed on Jun. 18, 2002.

(51) Int. Cl.
*F03G 7/00* (2006.01)
(52) U.S. Cl. .................................................... 60/641.2
(58) Field of Classification Search .............. 60/641.2, 60/641.3, 641.4, 641.5
See application file for complete search history.

(56) References Cited

U.S. PATENT DOCUMENTS

| | | | |
|---|---|---|---|
| 3,638,720 A * | 2/1972 | Thomas ...................... | 166/350 |
| 3,755,076 A | 8/1973 | Lindsley | |
| 3,827,243 A | 8/1974 | Paull et al. | |
| 3,938,334 A | 2/1976 | Matthews | |
| 3,938,335 A | 2/1976 | Marwick | |
| 3,974,394 A * | 8/1976 | Bailey ......................... | 290/44 |
| 3,986,362 A | 10/1976 | Baciu | |
| 3,988,896 A | 11/1976 | Matthews | |
| 4,023,136 A | 5/1977 | Lamensdorf et al. | |
| 4,100,744 A | 7/1978 | De Munari | |
| 4,107,987 A | 8/1978 | Robbins et al. | |
| 4,144,715 A * | 3/1979 | Fleck et al. ................. | 60/641.3 |
| 4,285,401 A * | 8/1981 | Erickson ...................... | 166/303 |
| 4,291,232 A | 9/1981 | Cardone et al. | |
| 4,372,386 A * | 2/1983 | Rhoades et al. ............. | 166/300 |
| 4,380,903 A | 4/1983 | Matthews | |
| 4,386,499 A | 6/1983 | Raviv et al. | |
| 4,407,126 A | 10/1983 | Aplenc | |
| 4,896,725 A * | 1/1990 | Parker et al. ................ | 166/267 |
| 4,899,534 A | 2/1990 | Sorenson | |
| 4,912,941 A * | 4/1990 | Buchi ........................... | 62/260 |
| 5,058,386 A * | 10/1991 | Senanayake .................. | 60/692 |
| 5,099,648 A | 3/1992 | Angle | |
| 5,513,573 A | 5/1996 | Sutton | |
| 6,259,165 B1 * | 7/2001 | Brewington ................. | 290/1 A |

FOREIGN PATENT DOCUMENTS

| | | |
|---|---|---|
| DE | 498700 | 5/1930 |
| DE | 2918001 | 11/1980 |
| FR | 2520448 | 1/1982 |

\* cited by examiner

*Primary Examiner*—Hoang Nguyen
(74) *Attorney, Agent, or Firm*—Fleshner & Kim, LLP (57) ABSTRACT

An energy producing apparatus and method are provided to harness thermal energy from a down hole resource (such as oil or gas) on an offshore rig and to generate electrical power from the thermal energy. This may include a pipe to receive either the high temperature gas or oil and a power module coupled to the pipe to convert thermal energy from the received oil or gas to electrical power.

32 Claims, 8 Drawing Sheets

APPARATUS AND METHOD FOR GENERATING ELECTRICAL ENERGY

This application claims priority from U.S. Provisional Application No. 60/389,282, tiled Jun. 18, 2002, and U.S. Provisional Application No. 60/389,283, filed Jun. 18, 2002.

BACKGROUND OF THE INVENTION

1. Field of the Invention

The present invention is related to electrical power generation. More particularly, the present invention is related to electric power generation utilizing geothermal resources such as oil and gas.

2. Background of Related Art

There are many known methods of using the heat of the earth (i.e., geothermal power) to produce electricity. Most methods, however, require expensive maintenance and are limited in that they produce environmental pollution, degrade the geothermal source and/or geographical location of the geothermal resource. Among the restraints that create the high costs of maintenance are the conditions of the geothermal resource, which often contains hydrochloric acid, sulphuric acid and/or nitric acid, all in the form of vapors or fumes that eat away at the materials used to harness the energy. A geothermal unit desired to last for an extended period of time typically includes a closed loop system, that is, a system that processes its internal media, usually water, from a gaseous state (steam) back to a liquid state in a continuing cycle. However, such a closed loop system has the problem of molecular mass growth of mineral or metallic matter that increases in volume over time. Although the water used in a closed system starts out inert, the carbon dioxide, and all minerals being removed, the continuing action of "molecular drag" of the water being forced through the system in its two basic states, water and steam, and enduring the many cycles of that transformation over time foments the environment under which this "molecular drag" takes place. When the molecular mass grows sufficiently, it becomes damaging to the working parts of the system and can be fatal to the turbine if it strikes the turbine blades at high pressure or high speed. It may also lock up the valves, gates and pumps of the power system.

Many methods use additional water that is pumped down into the geothermal source which is then heated by the geothermal source and either pumped back to the thermal jackets of the turbine boilers or returned of its own accord under pressure of contact with the geothermal source.

Conventional installations are costly and ponderous in size. Geothermal units also create environmental pollution by emitting gases that are brought to the surface, or by producing contaminated water that has been pumped from the geothermal source. The contaminated water is sometimes eliminated by forming surface ponds that contaminate the soil, or by diverting the runoff into ocean or waterways. In some systems, contaminated steam is dispersed into the atmosphere. Moreover, surface operations are highly noise polluting.

During the generation of electricity by coal or gas burning units, gas may be emitted and create "acid rain". This "acid rain" drifts with the prevailing winds and causes devastation to forests, rivers and the landscape. Similarly, for the average power plant, the area that must be cleared is very large. Additionally, there is a great deal of waste in power plants, such as steam turbines powered by gas, oil, or coal as most in use today require water streams of 500 or more gallons per minute to function, especially that use heat recovery generating systems (HRGSs). That water is usually dumped after use, typically downstream into a river or tributary at a temperature harmful to the ecosystem.

Waste is also generated by the continual usage of parts that must constantly be changed. These parts usually are discarded as they generally are not repairable. This creates yet another source of pollution. Of course, all fossil-fuel plants consume an irreplaceable resource, namely fossil fuel.

One of the more costly segments of conventional power installations is the manpower required to construct and operate the same. In particular, the electrical cable installations within the units are often subject to relatively high temperatures. Such environments lead to required changes of the wiring harness from time to time so as to keep the insulation from getting charred or brittle over time.

Additionally, because there is no harmonic synchronization between boiler and condensers, most power plants do not re-condense the steam to water, but rather discharge the steam. Those power plants that do recondense the steam to water have a myriad of pumps and valves that require a great amount of power for operation. The required power is often taken from what is generated thus lessening the amount of power available to be sold.

It can therefore be appreciated why most power systems are still not efficient and are still a pollution problem.

If power is to be made more affordable then it should also be made as safe as possible, non-polluting, immediately renewable, and reasonably limited in the amount of space and materials consumed. Moreover, it should be dependable for long periods of time and simple to supervise, manage and control.

SUMMARY OF THE INVENTION

Embodiments of the present invention may provide an energy producing apparatus. This may include a pipe to receive a down hole resource (such as gas or oil) and a power module coupled to the pipe to convert thermal energy from the down hole resource to electrical power.

A transfer tank may receive oil from the pipe at a first pressure and output the oil through a plurality of outflow pipes each at a pressure less than the first pressure. A boiler section of the power module may extend into the tank so as to receive thermal energy from the oil.

A heat exchange coil may heat salt water within a chamber using oil passing through the coil. The heated water may create condensation that may be used as potable water.

The power module may be mounted to an oil rig or a gas rig, and the pipe may extend below a surface of the Earth.

A flaring funnel may receive gas from the pipe and flare the gas. A boiler section of the power module may be heated using thermal energy of the flared gas.

Other embodiments and configurations of the present invention will become apparent from the following detailed description taken in conjunction with the accompanying figures.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto.

Embodiments of the present invention will be described with reference to the following drawings in which like reference numerals represent like elements and wherein.

DETAILED DESCRIPTION OF PREFERRED EMBODIMENTS

Embodiments of the present invention may hereafter be referred to as "The Prometheus System". The Prometheus System may use a Power Tube unit, for example. At least one such Power Tube unit is described in U.S. Pat. No. 6,259,165, the subject matter of which is incorporated herein by reference. Embodiments of the present invention are also applicable to use with systems (including other power tube units) other than those disclosed in U.S. Pat. No. 6,259,165.

A Power Tube unit or similar device as used with embodiments of the present invention may include a system for supplying electrical power by harnessing thermal energy of the Earth. The system may include components that perform functions of a boiler, turbine, condenser and generator. As described in U.S. Pat. No. 6,259,165, in the Power Tube unit the boiler may contain a plurality of tubes immerged in a sodium solution that becomes liquid at operational temperatures. This may insure thermal stability around the tubes that contain an iso-pentane/iso-butane mix which becomes a gas at relatively low geothermal temperatures. The turbine may be powered by the pressurized iso-pentane/iso-butane gas so as to turn at a speed, which turns the generator to produce electrical energy. As will be described, the Power Tube unit may be used on a platform above the surface of the Earth so as to capture thermal energy (from oil or gas) that is received from below the surface of the Earth.

Embodiments of the present invention may provide the following: a) reduction in oil pressure from a down hole resource to a receiving end; b) a reduction in oil temperature while in process from the down hole resource to the receiving end; c) the supply of electrical energy with minimal noise and pollution; d) the supply of fresh water in whatever quantity is desired (within the capacity of the resource); and e) a full communications platform with down link telephone and video service. Other features and advantages are also within the scope of the present invention.

Embodiments of the present invention may provide a system to enhance, stabilize, complement or secure an existing erratic, dangerous or unacceptable marginal situation aboard an offshore drilling platform, such as a submersible, floatation or jack up-type rig. Embodiments of the present invention may be designed as a self monitoring, stabilizing, system controlling package that can provide electrical energy, fresh water, oil and gas flow pressures and oil and gas temperatures where high temperature may be a problem when transferring from the down hole resource to the receiving system. This benefit may be provided on a continual uninterrupted basis over a period of several years (such as five years, for example) after which time it may be serviced and continue on a periodic uninterrupted service cycle. Other periods of operation are also within the scope of the present invention.

The system may be non-polluting, totally self sustaining, requiring very little maintenance. The system may include a center cylinder for oil flow, or a center dispersion plenum for gas flow. The system may also include a Power Tube unit (or similar device), a distilling section for sea water and a plurality of outflow pipes (of same or relatively similar size as the resource down hole supply pipeline) to reduce high flow pressures to acceptable levels.

The system may be modular. The modules may include a Power Tube unit having interchangeable modules depending on the power required and the resource available, a receiver cylinder (when high temperature oil is processed) or a dispersion plenum (when gas is processed), a water distillation cylinder module, an input side pipe fastening flange module, and a plurality of output fastening flange modules for gas or oil to bring the output pressure down to desirable levels. The Power Tube unit may be similar to, or different than, the system described in U.S. Pat. No. 6,259,165. For ease of illustration, embodiments of the present invention may be described with respect to the system disclosed in U.S. Pat. No. 6,259,165.

A down hole resource flow of oil may be processed through a cylinder. Alternatively, the down hole resource flow of gas may be processed through a dispersion plenum. Embodiments of the present invention may use heat from the high temperature oil or ignited gas to provide thermal energy to the Power Tube unit, which in turn provides electricity based on the thermal energy.

Embodiments of the present invention may pass high temperature oil through a distilling cylinder module to create condensation from sea water. The condensation may be pumped to potable water collecting tanks. In the case of flared gas, embodiments of the present invention may pass the gas through a similar distilling cylinder to which the sea water is pumped and thereby-distilled.

Embodiments of the present invention may also include satellite communication in the form of telephone, data or video service through a monitoring service that is monitored through a monitoring station.

Embodiments of the present invention may harness data generated by various sensors throughout the platform, pipeline monitors, pumps and motors. Data may also be obtained from any atmospheric information and/or security systems, for example. This data may be communicated to a central monitoring control that will provide data to the platform operators on the performance of their offshore rigs. This data may be in real time on an individual basis for each offshore platform.

Figure 3:
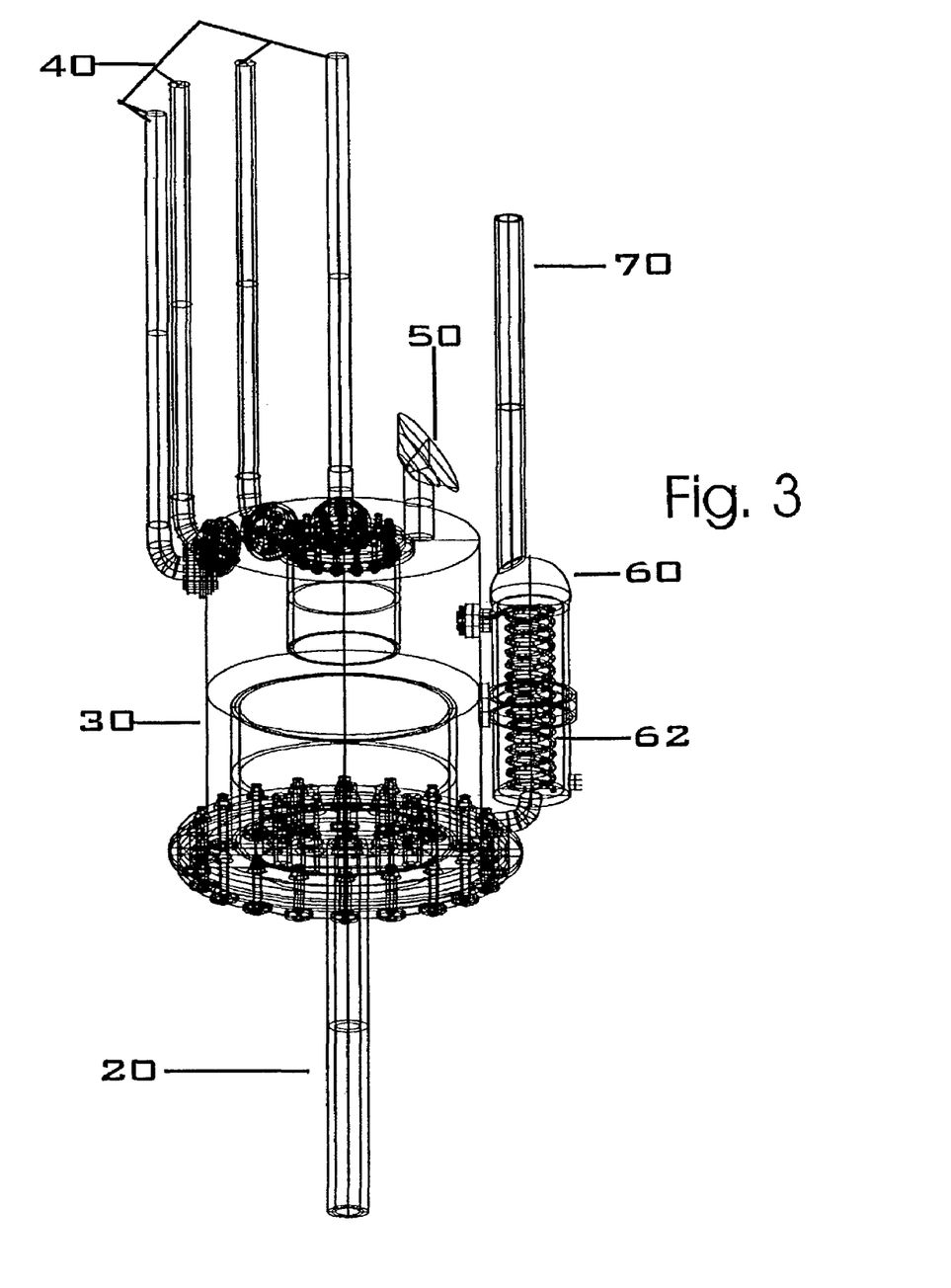
FIG. 3 shows details of the volumetric stabilization tank from FIG. 1 according to an example embodiment of the present invention.
Figure 4:
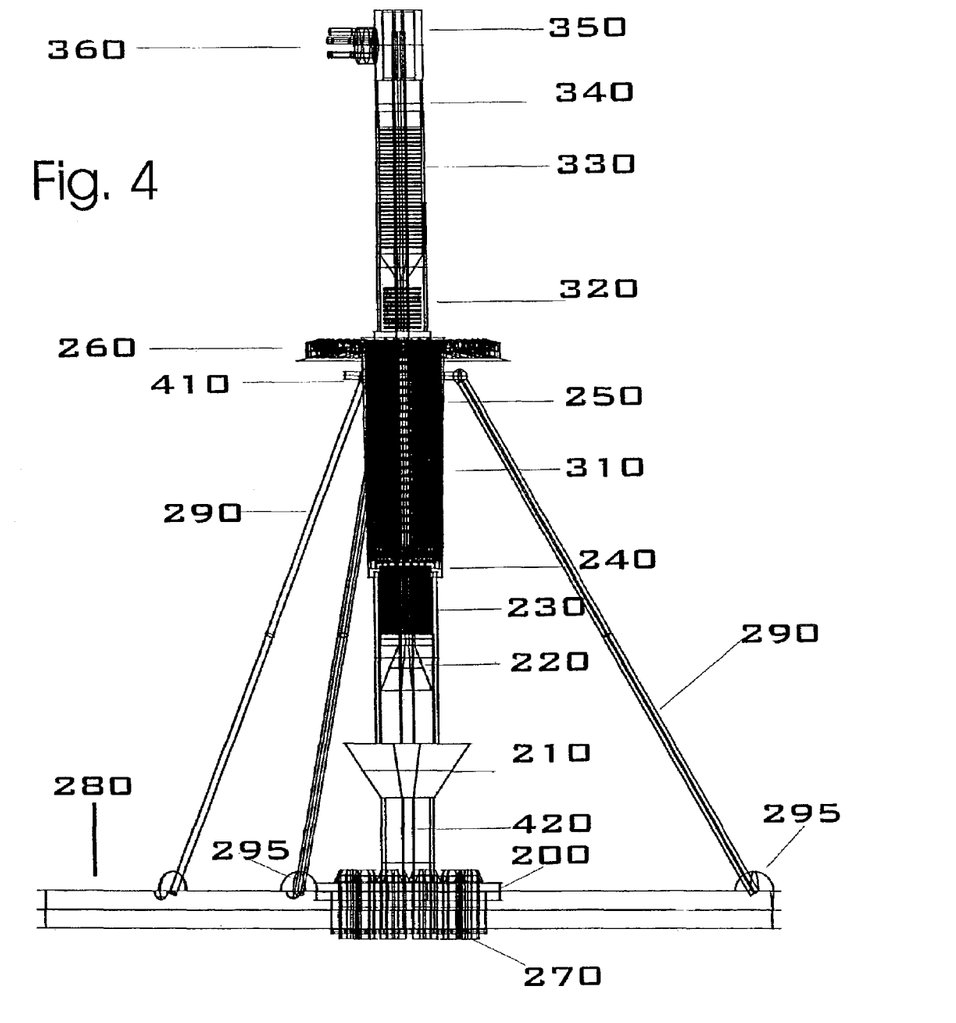
FIG. 4 shows a system for generating energy from flared gas according to an example embodiment of the present invention.
Figure 5:
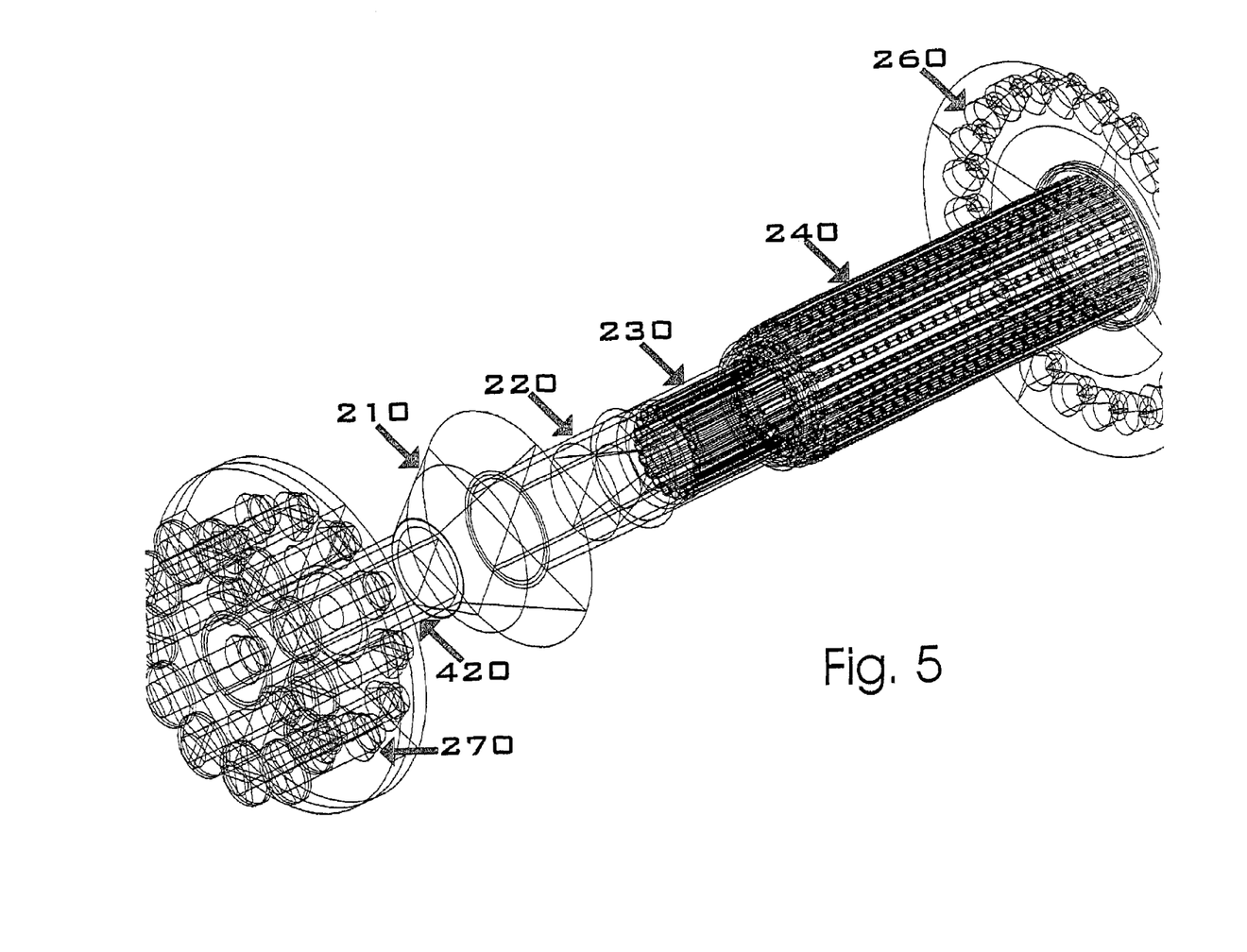
FIG. 5 shows the heat exchange and gas combustion area from FIG. 4 according to an example embodiment of the present invention.

Embodiments of the present invention will now be described in detail with respect to an oil system (FIGS. 1–3) and then to a gas system (FIGS. 4–5). Various components between these systems may be interchanged as will be understood to one skilled in the art.

Figure 1:
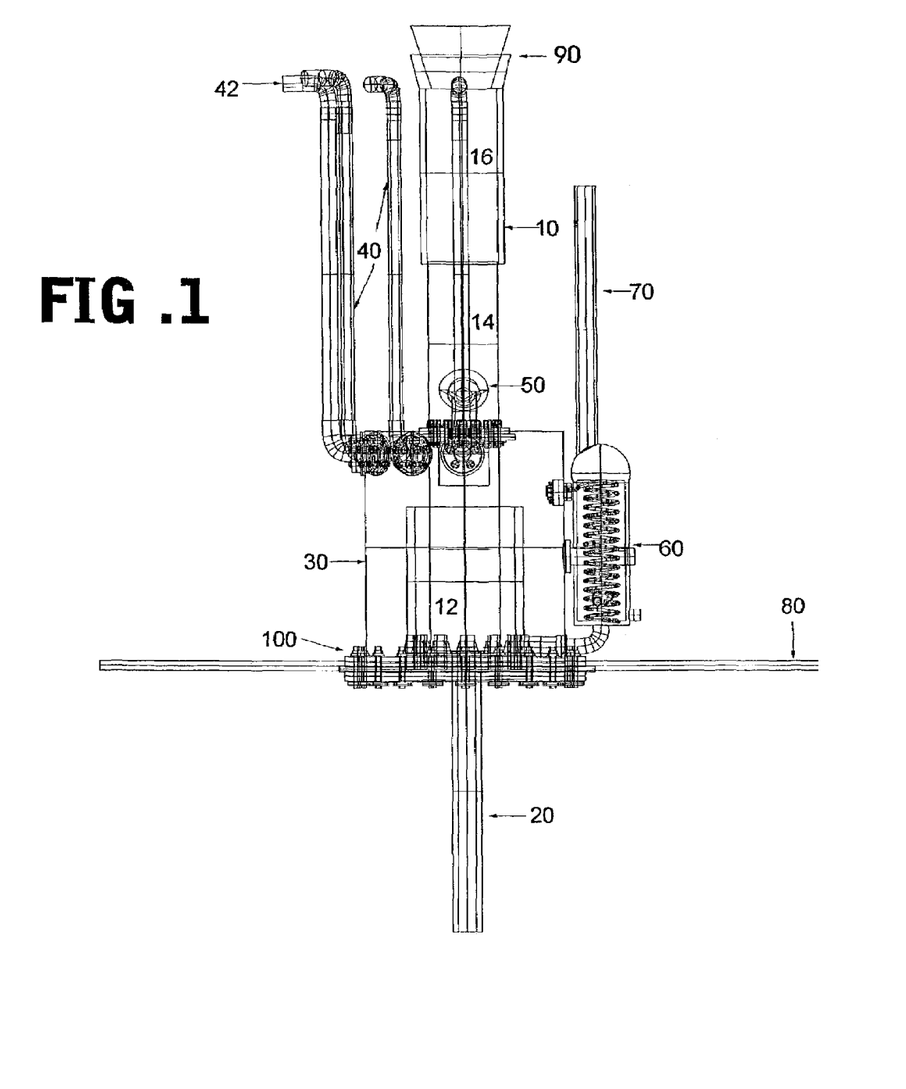
FIG. 1 shows a system for generating energy from oil according to an example embodiment of the present invention.

FIG. 1 shows an overall structure of a system for generating energy from high temperature oil according to an example embodiment of the present invention. Other embodiments and configurations are also within the scope of the present invention.

More specifically, FIG. 1 shows a Power Tube unit 10 similar to one described in U.S. Pat. No. 6,259,165. A pipeline 20 may extend from a transfer platform to a resource well (below the ocean floor). A volumetric stabilization transfer tank 30 may maintain a proper ratio of heat required to operate the Power Tube unit 10 within the transfer system with regard to the desired outflow temperature and pressure. Different temperature and pressure specifications may dictate different tank sizes.

The system may also include outflow pipes 40 that extend from the tank 30 and provide for the reduction in overall pressure of the oil from below the ocean floor. The size of the outflow pipes 40 may be relative to the acceptable pressures required at the transfer end of the pipeline 20. These pipes may also be called outflow pressure reduction pipes.

The system may still further include an uplink/downlink receiver 50 to provide satellite uplink/downlink for audio, digital and video information. Signals may be sent and received to a "Virtual Electric Company" at a monitoring center such as that described in U.S. Pat. No. 6,259,165. Video, data and voice communications may be transferred via satellite.

FIG. 1 further shows that the system includes a desalination system 60 having a tube with an evaporative capture dome to capture modules of condensation from superheated salt water. Hot oil may pass through a desalination coil 62 of the desalination system 60 in order to raise the temperature of sea water within a chamber to boiling. This may cause the boiled sea water to condense on the roof of the condensing dome. The condensation forming large droplets of potable water may be collected in capture channels and pumped to storage tanks. Potable water may be pumped from the collection dome of the desalination system 60 through pipes 70. The potable water may also be pumped to storage tanks.

The system may be attached to a steel plate 80 (or similar type of structure) on an offshore oil platform, oil rig or other mechanism. The attachment may be in the middle, on the surface of, or on any of the sides of the offshore platform. An attachment bolting 100 may be used at both a base of the Power Tube unit 10 and a base of the volumetric stablization transfer tank 30 for adhering the system to the steel plate 80 of the offshore platform.

A top flange 90 on top of the Power Tube unit 10 may act as an inner shield for the functioning components. The top flange 90 may house output controls of the Power Tube unit 10. The top flange 90 will be described in greater detail below with respect to FIG. 2.

The Power Tube unit 10 may include a boiler module 12, a turbine module 14 and a condenser and generator module 16. The boiler module 12 (i.e., the heat exchanger module) of the Power Tube unit 10 may be immersed in the oil (within the tank 30) from the down hole resource. The turbine module 14 of the Power Tube unit 10 may be coupled to the boiler module 12. The condenser and generator module 16 of the Power Tube unit 10 may be coupled to the turbine module 14. For ease of illustration, the condenser and generator module 16 is shown as one module. Alternatively, the condenser and generator module 16 may be more than one module such as one condenser module and one generator module.

The pipeline 40 may include directional outflow elbows 42 to which the continuing outflow pressure reduction pipes are preferably attached. These pipes may extend to a storage facility or a tanker vessel, for example.

Figure 2:
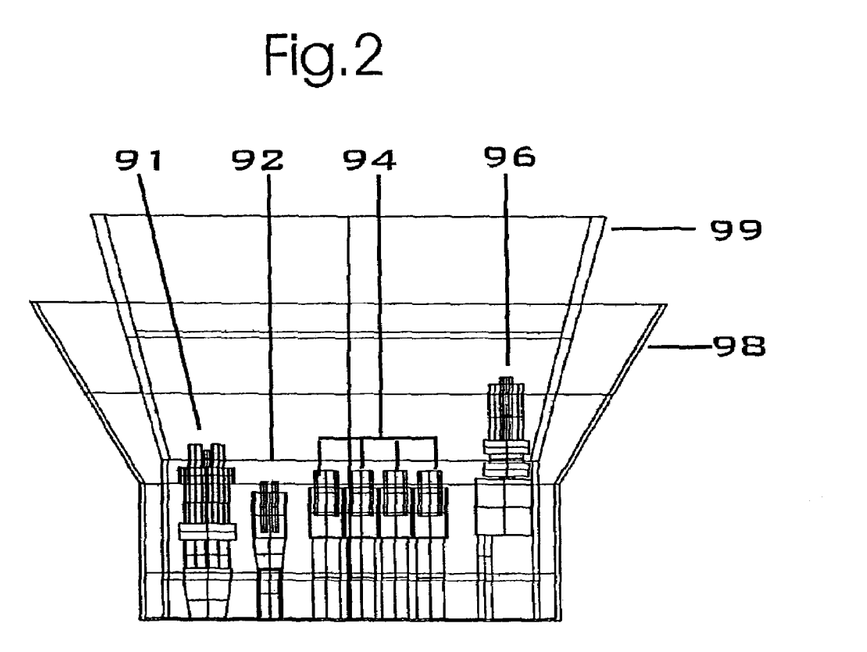
FIG. 2 shows details of the top flange from FIG. 1 according to an example embodiment of the present invention.

FIG. 2 shows details of the top flange 90 (of FIG. 1) according to an example embodiment of the present invention. Other embodiments and configurations are also within the scope of the present invention.

More specifically, FIG. 2 shows that the top flange 90 may include a pressure quick disconnect 91, an interlock connector 92, output cable connectors 94, quick disconnect compressed air start valve 96, an outer plenum casing 98 and an inner plenum casing 99. The pressure quick disconnect 91 may be used to fill the Power Tube unit 10 with turbine propellant. The interlock connector 92 may supply PLC information to a surface computer. Signals may be sent to a transceiver system and sampled every ten minutes, for example. These signals may be compressed into five second burst mode transmissions that allow a video panel at the monitoring center to be updated with its internal operating information. The output "turn and lock" cable connectors 94 may come directly from the generator module of the Power Tube unit 10. The quick disconnect compressed air start valve 96 and the outer plenum casing 98 may form a gap between the inner plenum casing 99. This gap may enable the expeller/impeller to draw down on surface air.

FIG. 3 is another view of the volumetric stabilizing tank 30 (of FIG. 1) according to an example embodiment of the present invention. Other embodiments and configurations are also within the scope of the present invention. As may be seen in this figure, the plurality of outflow pipes 40 may extend from the tank 30. Each of these outflow pipes 40 may be of substantially similar size as the incoming pipeline 20. As one example, the incoming pipeline 20 may receive oil at 10,000 psi. Due to the volumetric transfer tank 30 and four equally sized outflow pipes 40, the pressure of the oil from the outflow pipes may be 2,500 psi each. Each of the outflow pipes may also be a different size than the incoming pipe 20.

As discussed above, embodiments of the present invention may provide a system for the supply of electrical energy by harnessing and converting thermal energy found in high temperature/pressure oil. This oil may be found in offshore exploration systems by use of a system that incorporates a Power Tube unit, such as that described in U.S. Pat. No. 6,259,165, the subject matter of which is incorporated herein by reference.

Embodiments of the present invention may be designed to operate without interruption for at least five years, for example. The system may be silent, non-polluting, reducing pressure and temperature of the rising oil from the down hole resource and through thermal transfer and absorption of a portion of the heat energy, reduce the temperature of the out flowing oil toward the storage area. The system may also allow for the reduction of the incoming pressure by providing multiple outflow pipes in the same or varied size diameter pipeline as the incoming size diameter pipeline. The system may use the same thermal energy as processed through the system and found in the oil to provide potable water.

As one example, the system may include six sections (or modules) linked in interlocking order. The central section may include the Power Tube unit 10 that functions through the exchange of heat from the hot oil in the volumetric stabilization transfer tank 30 that receives the high pressure/temperature oil from the down hole pipeline 20 to thereby reduce the temperature of the oil by a ratio determined by the size of the tank 30, the heat demand of the Power Tube unit 10 and the flow and pressure ratios of the oil.

The desalination system 60 may use heat of the coil 62 containing the hot oil to elevate the temperature of the salt water that surrounds the coil 62 to a boiling temperature. The resulting condensation may be captured in the condensing dome of the desalination system 60. The massive accumulated volume of condensed droplets may become a small reservoir of potable water. The accumulate volume of the potable water may be pumped to the storage tanks on the platform through the pipes 70. The liberated minerals from the distilling process may be removed through a bottom valve of the desalination heat exchange system. The pipes 40 (or outflow pressure reduction pipes) may be relatively the same size as the pipeline 20 that comes from the down hole resource. In this example, the number of the pipes 40 divided by the original pressure reduces the pressure of the oil by the resulting number. The pipes may also be of different sizes.

The Power Tube unit 10 and the volumetric stabilization tank 30 may produce electrical power that is preferably sent to power panels of the offshore rig using the connectors 94 in the top flange 90. The internal workings of the Power Tube unit 10 may be captured through a programmable logic controller PLC. The PLC may generate digital output data through the latching connector 92, which in turn connects to the system computer, transceiver and uplink/downlink satellite system 50. As one example, the satellite system 50 may compress ten minutes of the Power Tube unit's activity into a five second burst mode signal that is subsequently decompressed and viewed at the monitoring center.

Embodiments of the present invention may also provide a system for the supply of electrical energy by harnessing flared gas from offshore gas rigs, for example. In the past, this gas was not used and therefore was wasted. Embodiments of the present invention may contribute to the lessening of pollution from the rigs and may decrease the level of noise.

Embodiments of the present invention may include a modified gas flaring funnel, a Power Tube unit (or similar device), an excess gas flaring rosette, and a protected tubing package that contains cables for power output, control, propellant feed and air start.

For example, FIG. 4 shows a system for generating energy from gas according to an example embodiment of the present invention. Other embodiments and configurations are also within the scope of the present invention.

FIG. 4 shows the gas system for extracting energy from a flared gas offshore platform. This system operates before the gas is flared from the rig. The modules that form the Power Tube unit are mounted and constructed to use the gas as the thermal material to activate the Power Tube unit through Is its own ignited, diffusion and dispersion system.

As shown in FIG. 4, a centering base 200 on a platform supports a gas flaring funnel 210. The gas flaring funnel 210 flares the gas from a down hole pipe to a primary gas injector cone 220. The gas injector cone 220 captures the flared gas and transfers the gas to a reducer diffuser tube array 230 (or a flaring gas distributor tube package) at a lower pressure. A primary burner array 240 (or a base circular burner) may further reduce the pressure of the gas and diffuse the gas to a secondary burner array 250 (or a plurality of vertical array nozzles) that surrounds a boiler section of the Power Tube unit. The heat of the gas provides the thermal energy for the Power Tube unit to produce electrical energy. An excess flaring system 260 may burn off any excess flared gas not used in the system.

The Power Tube unit may be an energy producing device that works based on thermal energy of the flared gas. The Power Tube unit may include a boiler module 310 (also called a heat exchanger module), a turbine module 320, a condenser module 330, an expansion tank 340 and a generator module 350, for example. Casing and system lines (or insulated cable packets) 360 may also be coupled to the Power Tube unit. The insulated cable packets may be designed to hold the cables and tubes.

A flare cone pipe riser 420 includes a pipe that receives the gas from below the surface of the Earth. The pipe extends through the platform 280 onto which is welded the gas flaring funnel 210. The gas flaring funnel 210 may be the base existing flare flame cone into which the capture system is seated. The primary gas capture cone 220 may capture the flared gas that directs its totality of the volume into the control and diffusion system.

The reducer diffuser tube array 230 may be a cylindrical tube array to reduce and diffuse pressure of the flared gas that is further used in the burner system. The primary burner array 240 may be the baseburner section that provides heat to the base area of the Power Tube unit's boiler module 310. The secondary burner array 250 may be a multiple circumferential array burner that provides heat to the surface of the Power Tube unit's boiler module 310.

The excess gas flaring system 260 may be a rosette that diffuses any excess gas that may be left over after the excess gas has passed through the heat exchange chambers of the Power Tube unit.

A bolting array 270 may be around the base of the flange that holds the system to a rig platform. That is, the platform 280 may be a base flange of the offshore gas rig. Stabilizing rods 290 may be provided between the centering base 200 and a stabilizing collar 410. The stabilization collar 410 may be provided around a center point of the overall system. Ball support centering bases 295 may help support the stabilizing rods 290.

Embodiments of the present invention may harness information through sensors and the Power Tube unit's programmable logic controller PLC. This information may relate to gas pressure and temperature, burner pressures and total temperature of the burner system as well as the ratios of left over gas to still be flared. The information may be forwarded to the respective monitoring panel at the Power Tube unit, or to a monitoring center through a satellite uplink burst mode system.

The casing and system lines 360 may take the power supply, PLC information, start up air pressure line and initial propellant lines to the local control and satellite uplink center on the offshore platform.

Embodiments of the present invention may provide a system for the supply of clean, noiseless electrical energy for the use of offshore gas rigs by harnessing heat that is produced by the very gas that previously was burned off into the atmosphere.

The system preferably may include a main power-producing device, a gas heat jacket that provides heat to the boiler module, a gas source, and a pipe that rises from the down hole of an offshore gas platform. As discussed above, the system may sit atop a support platform on an offshore rig such as the rig platform 280. The system may be supported by a plurality of stabilizing rods 290 that are affixed to containment leveling balls (such as the ball support centering bases 295) on the base plate.

Diverted gas from the main production gas flow may rise through the flare cone pipe riser 420 into the gas flaring funnel 220. Embodiments of the present invention provide for the capture of the flared off gas at the gas flaring funnel 210 rather than burning off the gas. More specifically, the gas capture cone 220 modulates the volume and any vortices in the gas and then transfers it to the reducer diffuser tube array 230 that further reduces the pressure and diffuses the gas into the primary base burner array 240 and further into the secondary burner array 250 encompassing the Power Tube heat exchanger. Excess gas within the system that is not used may be further flared off at the upper level rosette.

Embodiments of the invention may cause the heat generated in the primary and secondary burner arrays 240 and 250 to provide the necessary temperature for the liquid inside the Power Tube unit's boiler module 310 to become a gas and turn the turbine within the turbine module 320. This in turn turns the generator in the generator module 350 through a shaft that goes through the condenser module 330 and the expansion tank 340.

The power from the generator module 350 may be taken to a main offshore gas rig circuit breaker panel via the directional insulated casing tube 360 that contains the output cables of the generator, the digital output line from the PLC device that goes to the control computer and further to a satellite uplink. The satellite uplink system may compress the totality of the signals coming from the PLC, heater systems sensors, gas flow sensors, environmental sensors every ten minutes, into a five second burst mode that may be sent to a monitoring center where the signals update the monitor screen pertaining to the given offshore rig. The satellite system can also provide the offshore rig with data, voice and video communications. The insulated casing tube 360 may also transport the tubes from the two quick disconnect valves, one being the propellant fluid fill, the other the quick air start providing safety and insulation to the tubes as they go to their respective operating systems.

FIG. 5 shows the heat exchange and gas combustion area from FIG. 4 according to an example embodiment of the present invention. Other embodiments and configurations are also within the scope of the present invention. More particularly, FIG. 5 shows the bolting array 270 through which the flare cone pipe riser 420 allows the gas to rise. The gas may be flared by the gas flaring funnel 210 and captured by the gas capture cone 220 where it is transferred to the reducer diffuser tube array 230. FIG. 5 also shows the excess gas flaring system 260.

Figure 6:
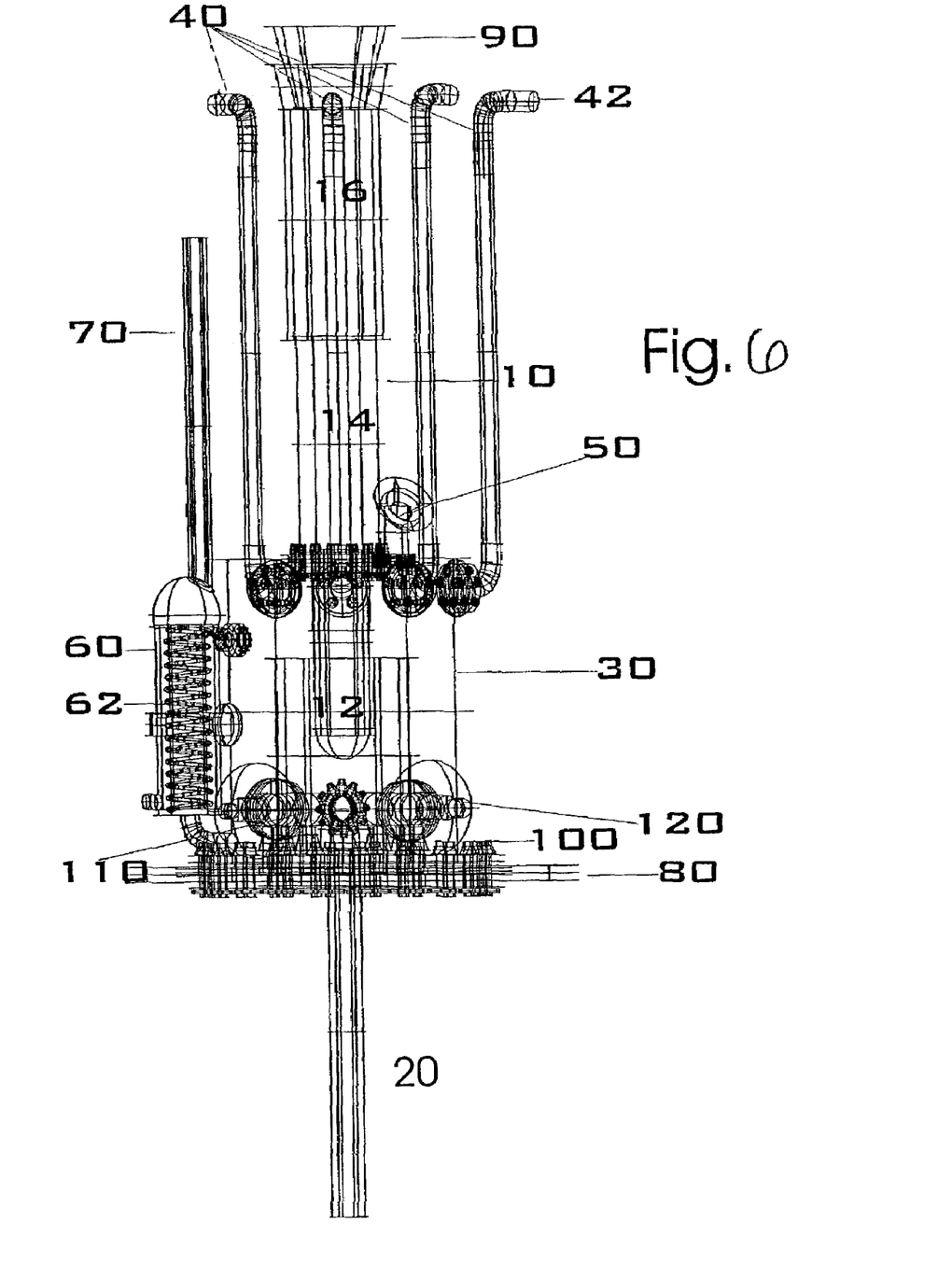
FIG. 6 shows a system for generating energy from oil according to another example embodiment of the present invention.
Figure 7:
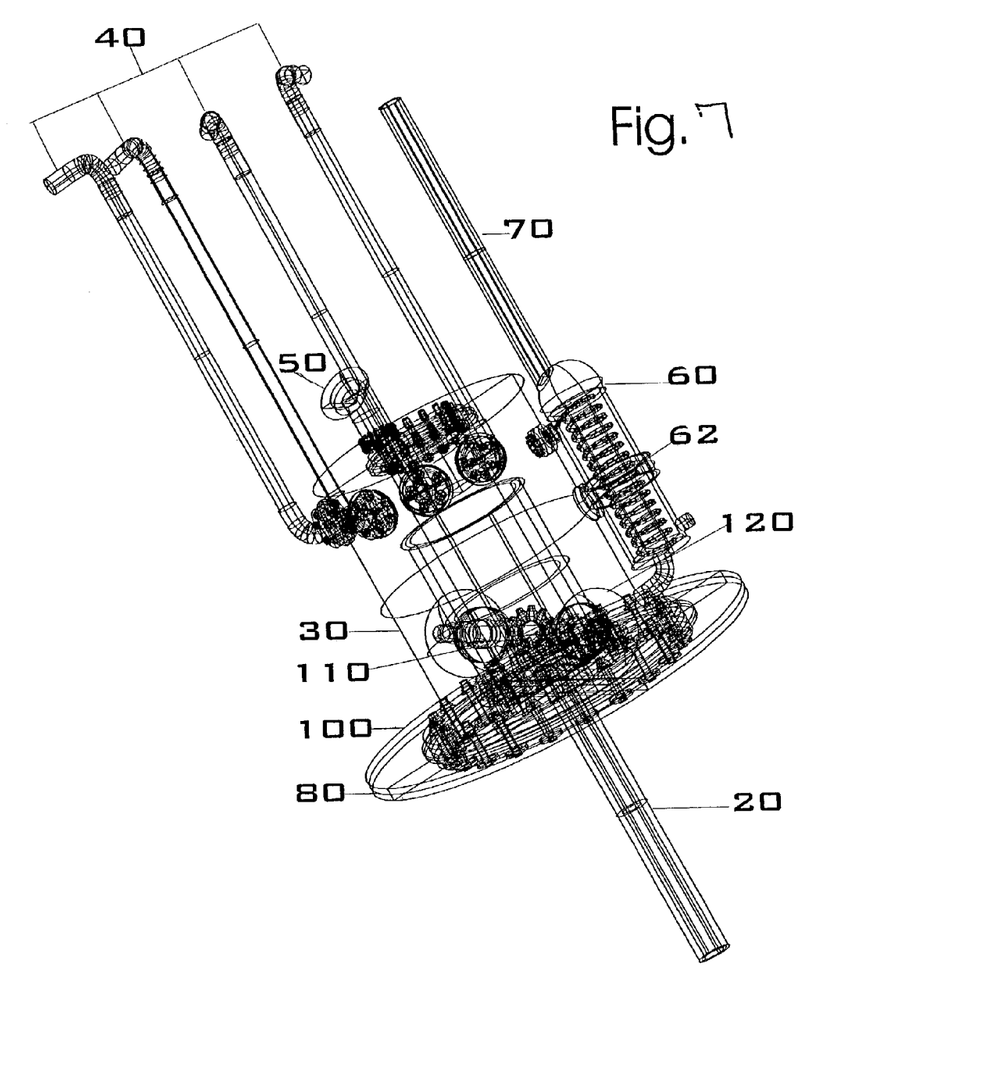
FIG. 7 shows details of the volumetric stabilization tank from FIG. 6 according to an example embodiment of the present invention.

FIGS. 6 and 7 show a system for generating energy from oil according to an example embodiment of the present invention. Other embodiments and configurations are also within the scope of the present invention. FIGS. 6 and 7 show components from the FIG. 1 embodiment and these similar components will not be described again. FIGS. 6 and 7 additionally include a declining pressure turbine/transmission 110 and tank 120. More specifically, due to the pressure of the oil (and gas) coming from the resource, the pressure as it rises into the Prometheus tank may pass through a declining pressure turbine/transmission 110. This may transmit power to dual power take off shafts on either side of the Prometheus tank 120. As the resource declines in pressure, the transmission automatically transfers the remaining energy to one or the other power take off shafts so that at all times one or the other shaft may have full power during the resource decline period.

Figure 8:
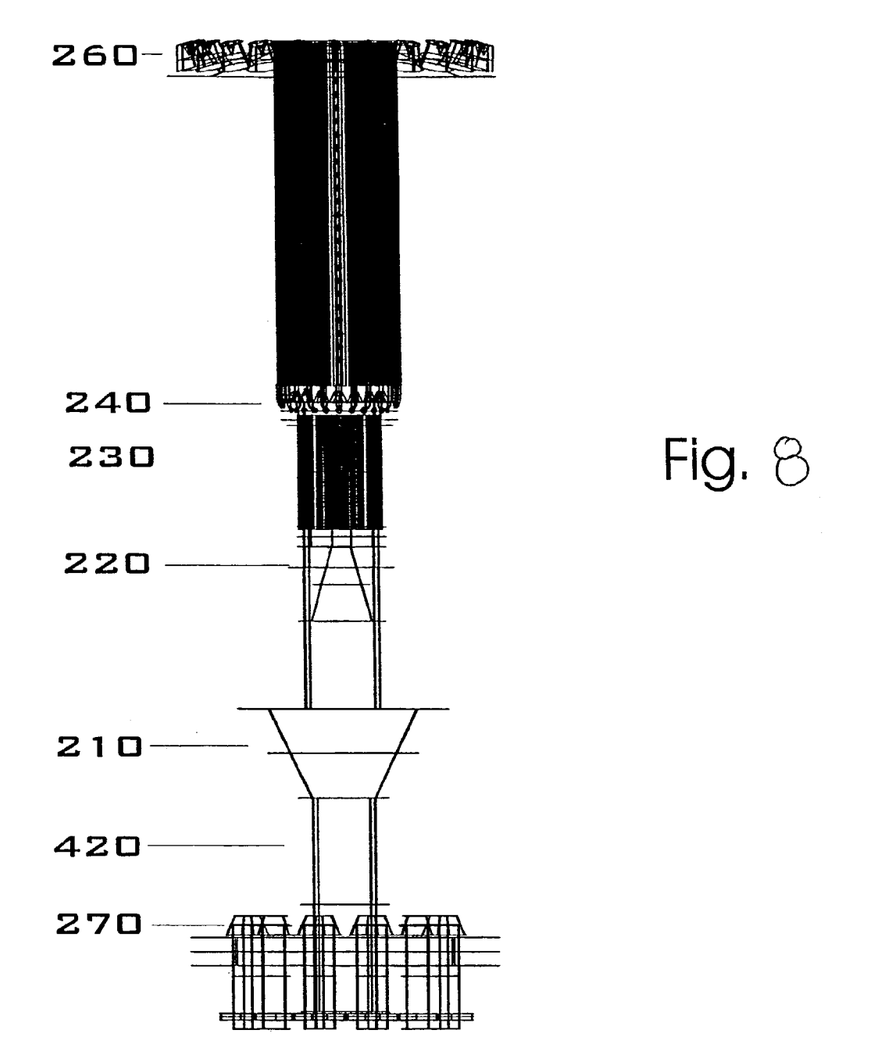
FIG. 8 shows a system for generating energy from flared gas according to another example embodiment of the present invention.

FIG. 8 shows a system for generating energy from flared gas according to another example embodiment of the present invention. Other embodiments and configurations are also within the scope of the present invention. The FIG. 8 example embodiment includes similar components as the FIG. 4 embodiment and therefore will not be described again in detail. The labeled components of the gas system shown in FIG. 8 include the bolting platform 270, the flare cone pipe riser 420, the gas flaring funnel 210, the reducer diffuser tube array 230, the primary burner array 230 and the excess gas flaring system 260.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed:

1. An energy producing apparatus comprising:
a pipe to receive a down hole oil resource;
a transfer tank to receive the down hole oil resource from the pipe;
a power module to convert thermal energy from said down hole oil resource received at the transfer tank to electrical power, wherein one end of said pipe is coupled to said transfer tank and one end of said power module is coupled to said transfer tank.

2. The apparatus of claim 1, wherein said pipe receives said oil resource at a first pressure, and said apparatus outputs said oil resource through a plurality of outflow pipes each at a pressure less than said first pressure.

3. The apparatus of claim 2, wherein said transfer tank is coupled between one end of said pipe and said plurality of outflow pipes.

4. The apparatus of claim 3, wherein said power module extends into said tank so as to receive thermal energy from said oil resource.

5. The apparatus of claim 1, wherein said power module includes boiler, turbine, condenser and generator components to produce electrical power from said oil resource.

6. The apparatus of claim 5, wherein boiler components of said power module are immersed in said oil resource received from said pipe.

7. The apparatus of claim 1, further comprising a system to create condensation from water based on a temperature of said oil resource.

8. The apparatus of claim 7, wherein said system includes a heat exchange coil which is heated by said oil resource and which converts sea water to said condensation.

9. The apparatus of claim 1, wherein said power module is mounted to an oil rig, and said pipe extends below a surface of the Earth.

10. A system to produce electrical power comprising:
a pipe to receive a down hole oil resource from below a surface of the Earth;
a platform provided substantially above the surface of the Earth and coupled to one end of said pipe so as to receive said down hole oil resource;
a transfer tank to receive the down hole oil resource from the pipe;
a device provided on said platform to be heated by said down hole oil resource received at the transfer tank and to produce electrical power based on said down hole oil resource, wherein one end of said pipe is coupled to said transfer tank and one end of said device is coupled to said transfer tank.

11. The system of claim 10, wherein said device receives said oil resource from said pipe at a first pressure and outputs said oil resource through a plurality of outflow pipes each at a pressure less than said first pressure.

12. The system of claim 11, wherein said transfer tank is coupled between one end of said pipe and said plurality of outflow pipes.

13. The system of claim 10, wherein said device includes a boiler module that extends into said tank so as to receive thermal energy from said oil resource.

14. The system of claim 10, wherein said platform comprises an oil rig.

15. The system of claim 10, wherein said device further creates condensation from water based on a temperature of said oil.

16. A method of producing electrical power comprising:
providing a power module on an oil platform;
receiving oil from below a surface of the Earth at a transfer tank; and
generating electric power using said power module coupled to the transfer tank based on said oil received at the transfer tank.

17. The method of claim 16, further comprising producing condensation from salt water based on thermal energy of said received oil.

18. The method of claim 16, further comprising reducing pressure of said received oil and outflowing said received oil at said reduced pressure.

19. The method of claim 16, wherein generating electrical power comprises using thermal energy of said received oil to heat a boiler section of said power module.

20. The apparatus of claim 1, wherein said power module includes a boiler module, a turbine module, a condenser module and a generator module coupled together as a unitary assembly.

21. The apparatus of claim 20, wherein the boiler module of the power module is immersed in the oil resource within the transfer tank.

22. The system of claim 10, wherein said device includes a boiler module, a turbine module, a condenser module and a generator module coupled together as a unitary assembly.

23. The system of claim 22, wherein the boiler module is immersed in the oil within the transfer tank.

24. The method of claim 16, wherein said power module includes a boiler module, a turbine module, a condenser module and a generator module coupled together as a unitary assembly.

25. The method of claim 16, wherein the boiler module is immersed in the oil within the transfer tank.

26. The apparatus of claim 1, further comprising a desalination system to produce potable water from salt water, the desalination system including:
a chamber containing the salt water; and
a coil in the chamber and coupled to the transfer tank, the coil carrying the down hole oil resource from the transfer tank, and the coil to heat the sea water in the chamber and produce the potable water.

27. The apparatus of claim 26, wherein the chamber includes a dome, the coil carrying the down hole resource to condense water on the dome and form the potable water.

28. The apparatus of claim 1, wherein the down hole oil resource comprises oil received from below a surface of the Earth.

29. The system of claim 10, further comprising a desalination component to produce potable water from salt water, the desalination component including:
a chamber containing the salt water; and
a coil in the chamber and coupled to the transfer tank, the coil carrying the down hole oil resource from the transfer tank, and the coil to heat the sea water in the chamber and produce the potable water.

30. The system of claim 29, wherein the chamber includes a dome, the coil carrying the down hole oil resource to condense water on the dome and form the potable water.

31. The system of claim 10, wherein the down hole oil resource comprises oil received from below the surface of the Earth.

32. The method of claim 16, further comprising producing potable water from salt water by passing the oil from the transfer tank through a coil so as to heat the salt water within a chamber and to produce the potable water.

* * * * *